ARRANGEMENT FOR FREQUENCY CONTROL

Filed Sept. 19, 1960

INVENTOR
GYÖRGY SZARVAS
BY Hane and Nydick
ATTORNEYS

United States Patent Office 3,168,651
Patented Feb. 2, 1965

3,168,651

ARRANGEMENT FOR FREQUENCY CONTROL

Gyorgy Szarvas, Stuvsta, Sweden, assignor to Telefonaktiebolaget L M Ericsson, Stockholm, Sweden, a corporation of Sweden Filed Sept. 19, 1960, Ser. No. 57,080
Claims priority, application Sweden, June 13, 1960, 5,759/60
1 Claim. (Cl. 307—88.5)

The present invention relates to an arrangement for frequency control. The arrangement is of the kind where the frequency control occurs by comparison of the frequency in question with a control frequency generated in the arrangement. It is difficult to obtain a sufficiently high precision with now known similar arrangements with passive circuits as this would require Q-values of several hundreds at the oscillating circuit which are made use of. In itself it would be possible to avoid this difficulty by the heterodyne principle but this principle generally requires a rather complicated circuit arrangement, which it is desired to avoid for several reasons. The purpose of the present invention is to provide an arrangement which is free of the drawbacks mentioned above. An arrangement according to the invention is characterized by an oscillator working in class C, which oscillator is tuned to a definite frequency, to wit the control frequency, and in a branch including a supply of electric energy has a gate circuit fed with the magnitude, the frequency of which is to be controlled by comparison with the control frequency.

Figure 1:
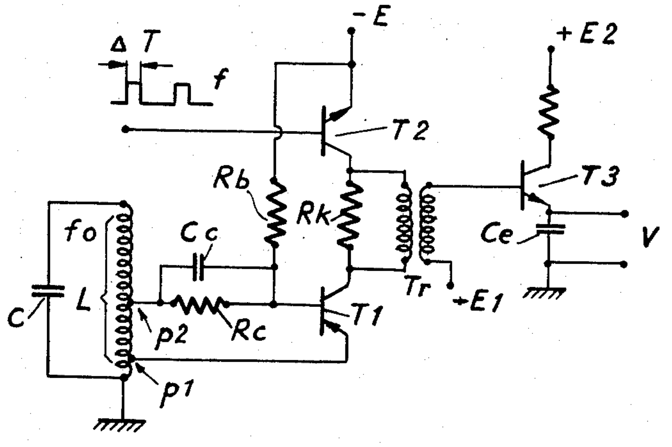
Figure 2:
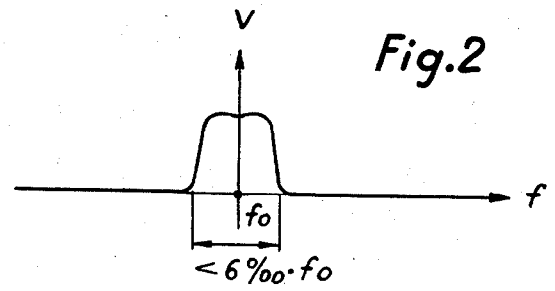

The invention shall be further described in connection with the accompanying drawing, which schematically shows an arrangement according to the invention. FIG. 1 shows the connecting diagram of the arrangement, and FIG. 2 shows a voltage-frequency diagram for an output magnitude from the arrangement according to FIG. 1.

The arrangement according to FIG. 1 comprises an oscillator working in class C and a gate circuit. The oscillator consists of a transistor T1, the collector of which is connected through a resistance R$k$ to an energy source —E (the transistor T2 is mentioned later on), the emitter of which is connected to a terminal $p1$ on an inductance L, the base of which is connected through a resistance R$b$ to the energy source —E, and is connected through a parallel connection of a resistance R$c$ and a condenser C$c$ to a secondary terminal $p2$ on the inductance L, which together with a condenser C constitutes an oscillating circuit with the reasonance frequency $f_0$. Consequently the oscillator is a normal base-emitter connected class C-oscillator, which produces a sine voltage at the oscillating circuit C–L and which has the transistor T1 intermittently carrying current with the pulse width $$\Delta T_0 \approx \frac{1}{\omega_0} \cdot \cos^{-1}\left(e^{-\frac{\pi}{Q}}\right)$$

where $$\omega_0 \frac{1}{\sqrt{LC}}$$

As to this formula of dimension see International Solid State Conference Digest 1960: "The base-emitter class C oscillator."

The gate circuit consists of a transistor T2, the collector-emitter section of which is connected between the resistance R$k$ and the energy source —E, its base is connected to the input terminal of the arrangement.

The arrangement also includes an output circuit, which comprises a transformer T$r$, the primary winding of which is connected through the resistance R$k$ and the secondary winding of which is connected between a voltage source —E1 and the base in a transistor T3. A condenser C$e$ is connected between the emitter of the transistor and ground. A voltage V is obtained at the condenser C$e$, the amplitude of which voltage is the result of the frequency control.

If the gate circuit T2 is disregarded for the time being, the remaining part of the arrangement works so that the oscillating circuit C–L oscillates with the frequency $f_0$, at which the transistor T1 is conductive intermittently and gives rise to a voltage V with a certain amplitude across the condenser C$e$. If the connection between the collector of the transistor T1 and the energy source —E should be broken during the phases when the transistor T1 is not conductive nothing is of course changed in the static oscillating processes. Consequently it is possible to provide an intermittent working contact, for instance, the gate circuit T2, if it is in the main conductive to the same extent as the transistor T1. Investigation has shown that if the gate circuit T2 is fed with a pulse formed control voltage, the pulse repetition frequency $f$ of which diverges with just a few per mille from the resonance $f_0$, there is no voltage obtained over the condenser C$e$, that is, the frequency dependent voltage V, see FIG. 2, provides a very good indication of any frequency divergences of the fed pulse formed voltage which, in turn, can be derived by conventional means from for instance a substantially sine formed voltage.

An arrangement according to the invention can of course be dimensioned in many different ways without departing from the scope of invention. As an example some suitable data for an arrangement intended for frequency control on a magnitude with the frequency 12.5 kHz. will be stated in the following.

The pulse width $\Delta T_0=20$ $\mu$s.; the pulse width $\Delta T=4$ $\mu$s.; $f=12.5$ kHz.; $C=15\cdot10^{-9}$ f.; $L=10.8$ mh.; $Rc=5.6$ k$\Omega$; $Cc=10\cdot10^{-9}$ f.; $Rb=560$ k$\Omega$; $Rk=470\Omega$ and $Ce=1$ $\mu$f. The relation between the number of turns of the whole inductance L and the number of turns from $p2$ to ground and the number of turns from $p1$ to ground is 7.5:2:1.

With an arrangement so dimensioned the oscillator oscillates normally when the frequency divergences of the fed control voltage are below a few ‰, for instance, ±3‰, but stops oscillating when there are larger frequency divergences.

As appears from the foregoing is $\Delta T < \Delta T_0$. The arrangement is more sensitive with diminishing ΔT but there is a lower limit for ΔT as the energy supplied to the oscillator from the energy source —E is then insufficient so that as a result the voltage V becomes zero. The lower limit may be defined by stating that at least the losses in the oscillator must be made up by the energy supply from the source —E.

I claim:

An arrangement for indicating deviations of frequency of a pulse-formed electric signal, said arrangement comprising an oscillator tuned to a predetermined control frequency and working in class C, a source of electric energy for the oscillator, means for indicating the oscillating condition of the oscillator, first circuit means connecting said oscillator to said source of energy to transmit electric energy from said source to said oscillator to compensate for oscillating losses of the oscillator to a degree which is determined by the phase relationship of the oscillations to the pulse occurrence, a gate circuit having current-conducting elements included in said first circuit means and a control element, and second circuit means for feeding said pulse-formed electric signal to the control element of said gate circuit, said gate circuit permitting transmission of electric energy from said source of energy to the oscillator only during time intervals in which pulses appear in said pulse-formed electric signal, whereby the frequency deviations of the pulse-formed electric signal are indicated by phase comparison between said pulses and the oscillations of the oscillator.

References Cited in the file of this patent

UNITED STATES PATENTS

| | | |
|---|---|---|
| 2,951,995 | Rosier et al. | Sept. 6, 1960 |

FOREIGN PATENTS

| | | |
|---|---|---|
| 1,003,465 | Germany | Feb. 28, 1957 |